Nov. 5, 1940.    B. C. PLACE    2,220,826
SECURING HOLLOW MOLDINGS
Filed Nov. 14, 1935
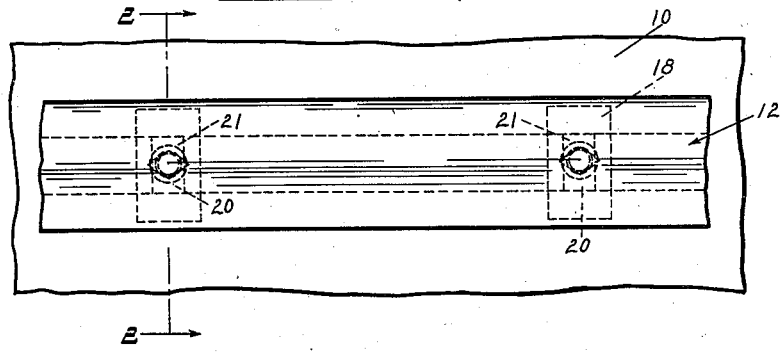
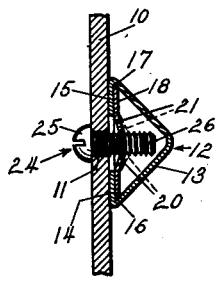 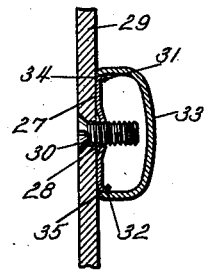
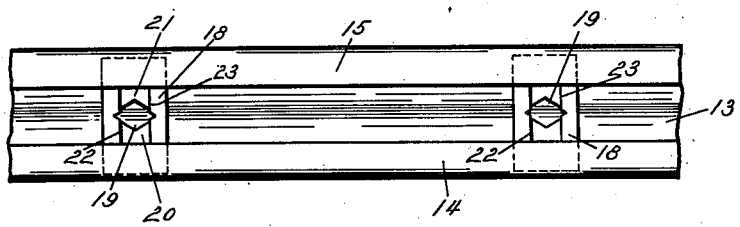
Inventor
Bion C. Place
By Strauch & Hoffman
Attorneys Patented Nov. 5, 1940

2,220,826

UNITED STATES PATENT OFFICE 2,220,826

SECURING HOLLOW MOLDINGS

Bion C. Place, Detroit, Mich., assignor of one-half to George E. Gagnier, Detroit, Mich.

Application November 14, 1935, Serial No. 49,853

3 Claims. (Cl. 189—88)

This invention relates to a novel arrangement for securing hollow moldings upon a supporting structure. More particularly, the invention is concerned with the securing of hollow moldings of the type that include a pair of spaced inturned flanges upon a supporting structure of the type in which the rear of the structure is accessible for the application of a screw-threaded fastener.

In the construction of motor vehicle or like bodies, hollow moldings are widely used for purposes of providing a finished appearance and for ornamentation, and said moldings are now very frequently applied by means of snap fasteners, the heads of which are mounted in the molding and the holding parts of which are snapped into openings in the structure to which the molding is secured, the holding parts of the fastener projecting substantially beyond said structure. Such constructions are entirely satisfactory except when moldings are applied in the manner just stated to supporting structures, the backs of which are exposed. In constructions of the latter type objection is made to the use of snap fasteners in the manner stated because the protruding fasteners, even if not exposed to view, are regarded as objectionable inasmuch as when the part of the body is cleaned or washed the hands or cleaning device of the person engaged in cleaning the body are liable to be caught on the protruding ends of the fasteners.

A primary purpose of the present invention is to provide a fastening arrangement designed particularly for use in situations in which it is desirable to provide a flush or substantially flush surface between fasteners used to secure moldings and the back of the supporting structures to which the moldings are attached, and at the same time to provide an arrangement that will permit the securing of the molding to the supporting structure with the same degree of facility that characterized the securing of moldings by means of snap fasteners in the manner above referred to.

Another object of the invention consists in the provision of an improved molding ready for attachment upon a supporting structure by means of screw-threaded fasteners and comprising only the molding and spring plates slid into proper position in the molding and having openings formed to readily engage a threaded fastener with a minimum amount of turning of the fastener.

Still another object of the invention is to provide an improved arrangement for securing moldings in which the protruding ends of the fasteners are housed within the hollow molding, and in which heads of the fasteners are disposed at the side of the supporting structure beyond the molding.

Further objects of the invention will appear as a description thereof proceeds with reference to the accompanying drawing in which Figure 1 is a fragmentary side elevational view showing a piece of molding applied to a supporting structure in accordance with the present invention.

Figure 2 is a cross-sectional view taken on the plane indicated by the line 2—2 in Figure 1, looking in the direction of the arrows.

Figure 3 is a view of the molding of Figure 1, removed from the supporting structure and as seen from the side of the molding that in applied position is in contact with the supporting structure.

Figure 4 is a cross-sectional view showing a modified form of the invention.

Like reference characters indicate like parts throughout the several figures.

A fragment of a supporting structure, designated by 10, is provided with openings 11 at spaced intervals for the reception of the fasteners intended to secure a molding designated as a whole by the numeral 12 upon said structure over said openings. The molding 12 may assume any desired form. Moldings now commonly used are of the hollow configuration illustrated in Figure 2 and comprise a body portion 13 and inturned flanges 14 and 15 that are spaced apart, permitting the passage of the fastener presently to be referred to through the space between said flanges. Preferably the flanges 14 and 15 form relatively sharp angles with the body portion 13 providing corners 16 and 17.

In order that the molding just described may be secured upon the supporting structure 10 with great facility the molding is provided with a plurality of spring plates 18 disposed at the point of the molding 12 at which fasteners are to engage the molding. Preferably, the plates 18 are rectangular in outline as illustrated and extend from the corner 16 to the corner 17 of the molding snugly fitting in said corners. The plates are applied to the molding by sliding them into the desired position after insertion from the end or from a part of the molding at which the flanges 14 and 15 are cut away. The length of the plate is preferably substantially the same as the spacing between opposite walls of the hollow molding so that the plates fit snugly between said walls and remain frictionally in the position to which they are adjusted along the length of the molding during the application of the molding.

Each of the plates 18 is provided with an opening 19 and two tongues 20 and 21 formed by separating the tongues from the body of the plate by parallel slits 22 and 23. Normally the tongues 20 and 21 are bent out of the plane of the plate to the position indicated in dotted lines in Figure 2 of the drawing. It will be observed that, as indicated in the drawing, the ends of the tongues form a part of the wall of the opening 19.

A hollow molding having spring plates such as just described assembled therein at the point at which fasteners are to be used may be secured to said support with great ease and facility, by disposing the molding with the spring plates therein upon the support with the openings 19 in the spring plate in registry with the openings 11 in the supporting structure 10. Fasteners in the form of headed screws 24, each having a head 25 and a shank 26 provided with a helical groove in conventional form are used as the securing means. The molding is secured upon support 10 by successively passing the shanks of the screws through the aligned openings 11 and 19. The screws may be inserted by a reciprocatory motion, the spring tongues 20 and 21 yielding as the screws are passed through the opening 19, said tongues being designed so as to contact with the threaded portion of the fastener at four points, said points being located on a circle having a diameter less than the diameter of the screw measured at the top of the thread and a diameter greater than the diameter of the screw measured at the bottom of the thread. As a result, when the screw is passed through the opening 19, the tongues snap successively over the successive threads and when the head of the screw contacts with the side of the support opposite from that against which the molding is disposed, the tongues will be disposed in the helical groove. A firm connection is then brought about by turning the screw only a revolution or two which turning causes the tongues 20 and 21 to be moved toward the plane of the plate 18, from the dotted line position in Figure 2 to the full line position indicated in said figure. In such position the ends of the tongues are wedged against the bottom of the helical groove and the molding is held fixedly in position while the screw is held from turning by firm frictional engagement of the ends of the tongue with the groove. It will be understood therefore that the screws may be applied with great rapidity inasmuch as they can be simply reciprocated into position and then turned a revolution or so to bring about the desired firm and locked engagement between the spring plates and the screw. The required number of screws are successively applied to the spring plate mounted in the moldings in the manner just described. The operation of bringing about the connection between the spring and the fasteners is thus brought about with approximately the same facility that characterizes the insertion of a snap fastener.

If desired the hollow moldings may be attached by use of spring plates above described in the manner illustrated in Figure 4 of the drawing in which a spring plate 27 having an opening 28 therein of the form above described with reference to the spring plate 18 is secured upon a support 29 by means of a screw 30, the head of which may be disposed flush with the surface of the support 29 remote from that against which the molding is attached. In this form of the invention the edges of the plate 27 are curled upwardly providing beads 31 and 32. Spring plates having this form may be secured to the support 29 before assembly of the plates with a hollow molding, said plates being successively secured to the support by means of fasteners passing through aligned openings. After the plates have been secured upon the support 29 in alignment, a molding 33 may be snapped upon the beaded edges 31 and 32 of the aligned plates by bringing the inturned edges 34 and 35 of the molding opposite the beads and applying pressure in the direction necessary to support the said inturned edges over the beads. The springiness of the edges of the molding and the resilience in the beads will permit the inturned edges 34 and 35 to pass the beads and become engaged in back of the beads 31 and 32 and in contact with the support 29. It will be understood that in this form of the invention the operation of assembling the spring plate in accurate position in the hollow molding is avoided, and that the necessary registry between the opening in the spring plate and the opening in the support through which the screw is passed can be brought about with facility, and the spring plate then secured by the screw before it is concealed by the hollow molding subsequently snapped thereon in the manner above described.

While several specific forms of molding have been illustrated in the drawing forming a part of this application, it will be understood that the fastening arangements, above described, may be applied to moldings, the bodies of which assume various configurations.

It will be observed that the rear side of the support is substantially free of projection in Figure 2 only the round head of the screw projecting from said side while when screws such as illustrated in Figure 4 are used there are no projections whatever from said side of the support.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a supporting structure, a hollow molding upon said structure having inturned flanges forming a slot covered by the body of the molding, said inturned flanges and said body at their meeting point forming corners paralleling the slot in said molding, a rectangular spring plate snugly fitting within said molding and lapping said flanges with its ends engaging said corners and having an opening opposite said slot, portions of said plate adjacent said opening extending at a slight angle to the normal plane of said plate and threaded means passing through said supporting structure and drawing said portions toward said flanges whereby the flanges of said molding are yieldingly pressed against said supporting structure.

2. In combination, a supporting structure, a hollow molding upon said structure having inturned flanges forming a slot covered by the body of the molding, spring plates snugly fitting between opposite walls of said molding and each having an opening opposite said slot, and a pair of spring tongues disposed at a small angle to the plane of each of said plates with the ends of said tongues forming a part of the wall of said opening, and screws passing through said supporting structure and having their threaded ends engaging said tongues and exerting a yielding pressure through said tongues against said flanges, whereby said molding is caused to bear resiliently on said supporting structure.

3. In combination, a supporting structure, a hollow molding upon said structure having inturned flanges forming a slot covered by the body of the molding, a spring plate snugly fitting within said molding and lapping said flanges, said plate having an opening opposite said slot, and a pair of spring tongues extending toward each other from points above said respective flanges and normally disposed at a small angle to the plane of said plate and having notches cut in the ends of said tongues, said ends forming a part of the wall of said opening, and a screw passing through said structure and its threaded end reciprocated through said opening and then turned to cause said plate to exert a yielding pressure upon said flanges.

BION C. PLACE.